United States Patent [19]

Takii

[11] Patent Number: 4,653,270
[45] Date of Patent: Mar. 31, 1987

[54] EXHAUST SYSTEM FOR V-TYPE ENGINE

[75] Inventor: Osamu Takii, Hamamatsu, Japan

[73] Assignee: Yamaha Hatsudoki Kabushiki Kaisha, Iwata, Japan

[21] Appl. No.: 764,655

[22] Filed: Aug. 12, 1985

[30] Foreign Application Priority Data

Sep. 14, 1984 [JP] Japan .................................. 59-191652

[51] Int. Cl.⁴ ............................................. F01N 3/28
[52] U.S. Cl. ....................................... 60/302; 60/323
[58] Field of Search .................. 60/299, 301, 302, 323

[56] References Cited

U.S. PATENT DOCUMENTS

| | | | |
|---|---|---|---|
| 3,767,764 | 10/1973 | Dolbear | 60/301 |
| 3,984,975 | 10/1976 | Price | 60/301 |
| 4,050,245 | 9/1977 | Little | 60/323 |
| 4,245,471 | 1/1981 | Sugasawa | 60/301 |
| 4,287,716 | 9/1981 | Schuster | 60/301 |

Primary Examiner—Douglas Hart
Attorney, Agent, or Firm—Ernest A. Beutler

[57] ABSTRACT

A motor vehicle having a transversely disposed V-type engine with first and second exhaust manifolds associated with the forward and rearward cylinder banks, respectively. An exhaust pipe interconnects both of the exhaust manifolds with a single rearwardly positioned catalytic converter and an auxiliary catalytic converter is positioned in the exhaust pipe so that only the exhaust gases from the forwardmost exhaust manifold pass through it.

14 Claims, 4 Drawing Figures

EXHAUST SYSTEM FOR V-TYPE ENGINE

BACKGROUND OF THE INVENTION

This invention relates to an exhaust system for engines and more particularly to an improved exhaust system for engines having separate manifolds such as V-type engines.

In many types of internal combustion engines, the exhaust system includes more than one exhaust manifold. The exhaust manifolds may feed into a common tailpipe in which a device such as a catalytic converter may be positioned for treating the exhaust gases. Frequently, the layout of the engine is such that one of the exhaust manifolds is spaced a substantially greater distance from the common catalytic converter than the other of the exhaust manifolds. Under these circumstances, the exhaust gases from the further manifold may have cooled sufficient so that their treatment in the catalytic converter will not be as complete as those from the closer manifold. This can result in exhaust gas emissions that are higher than desired.

It is, therefore, a principal object of this invention to provide an exhaust system for engines having separate manifolds and a common converter wherein the exhaust gases from the two manifolds are equally as well treated.

It is another object of this invention to provide an exhaust system for engines having more than one exhaust manifold that are spaced different distances from a catalytic converter and wherein a device is provided for insuring that the exhaust gases from both manifolds are equally as well treated.

In order to more effectively utilize the space in automotive vehicles, it has been proposed to position the power plant so that it extends transversely to the longitudinal axis of the vehicle and so that it is disposed in close proximity to the axles which it drives. If the engine is of the V-type, this means that one bank extends across the forwardmost portion of the car while the other bank is more rearwardly disposed. With such arrangements, it is difficult to provide an effective exhaust system for both banks that will provide adequate tuning and other performance.

It is, therefore, a still further object of this invention to provide an improved exhaust system for transversely disposed V-type engines.

It is another object of this invention to provide an improved exhaust system for a vehicle having a transversely disposed V-type engine.

SUMMARY OF THE INVENTION

A first feature of this invention is adapted to be embodied in an exhaust system for an engine having a first exhaust manifold, a second exhaust manifold, a first catalytic converter and exhaust pipe means connecting each of the exhaust manifolds to the first catalytic converter. The portion of the exhaust pipe means that connects the first exhaust manifold to the first catalytic converter is substantially longer than the portion of the exhaust pipe means that connects the second exhaust manifold to the first catalytic converter. A second catalytic converter is positioned in only the portion of the exhaust pipe means that connects the first exhaust manifold to the first catalytic converter for flow of exhaust gases through the second catalytic converter only from the first exhaust manifold.

Another feature of the invention is adapted to be embodied in a motor vehicle having a transversely disposed V-type engine with forwardly and rearwardly positioned cylinder banks. A first exhaust manifold is affixed to the forward cylinder bank for receiving its exhaust gases and a second exhaust manifold is connected to the rearwardmost cylinder bank for receiving its exhaust gases. A first exhaust device is positioned remotely from the engine and exhaust pipe means connect the first and second exhaust manifolds to the first exhaust device for flow of all of the exhaust gases from both the first and second exhaust manifolds through the first exhaust device. A second exhaust device is positioned contiguous to the engine and the exhaust pipe means is such that the exhaust gases flowing through the second exhaust device come only from the first exhaust manifold.

DETAILED DESCRIPTION OF THE PREFERRED EMBODIMENT

Figure 1:
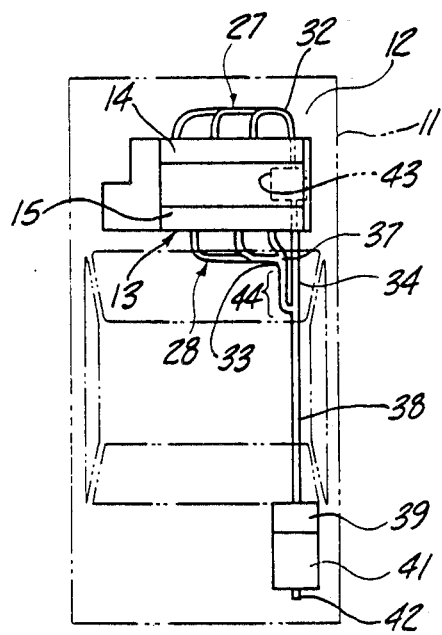
FIG. 1 is a partially schematic, top plan view of a motor vehicle having an internal combustion engine and exhaust system constructed in accordance with an embodiment of the invention. The engine and its exhaust system are shown in solid lines and the remaining portions of the vehicle are shown in phantom.
Figure 4:
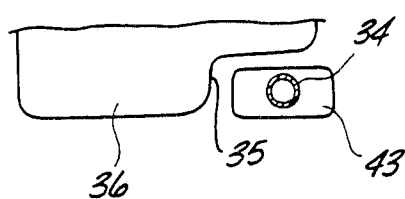
FIG. 4 is a reduced scale, rear elevational view showing the engine crankcase and one of the exhaust devices taken along the line 4—4 of FIG. 3.

Referring now in detail to the drawings, the reference numeral 11 indicates generally a motor vehicle constructed in accordance with an embodiment of the invention. The motor vehicle is, in the illustrated embodiment, of the front wheel drive type although it is to be understood that the invention may be employed in connection with vehicles having other configurations. As a front wheel drive vehicle, the vehicle 11 has a forwardly positioned engine compartment 12 in which an engine, indicated generally by the reference numeral 13, is positioned. The engine 13 is of the transverse type, that is, that it is disposed with its crankshaft rotating about an axis that extends transversely to the longitudinal axis of the vehicle 11. The engine 13 is also of the V configuration and has a forwardly disposed cylinder bank 14 and a rearwardly disposed cylinder bank 15. In the illustrated embodiment, the engine 13 is of the six cylinder type and thus each bank 14 and 15 is comprised of three cylinders.

Figure 3:
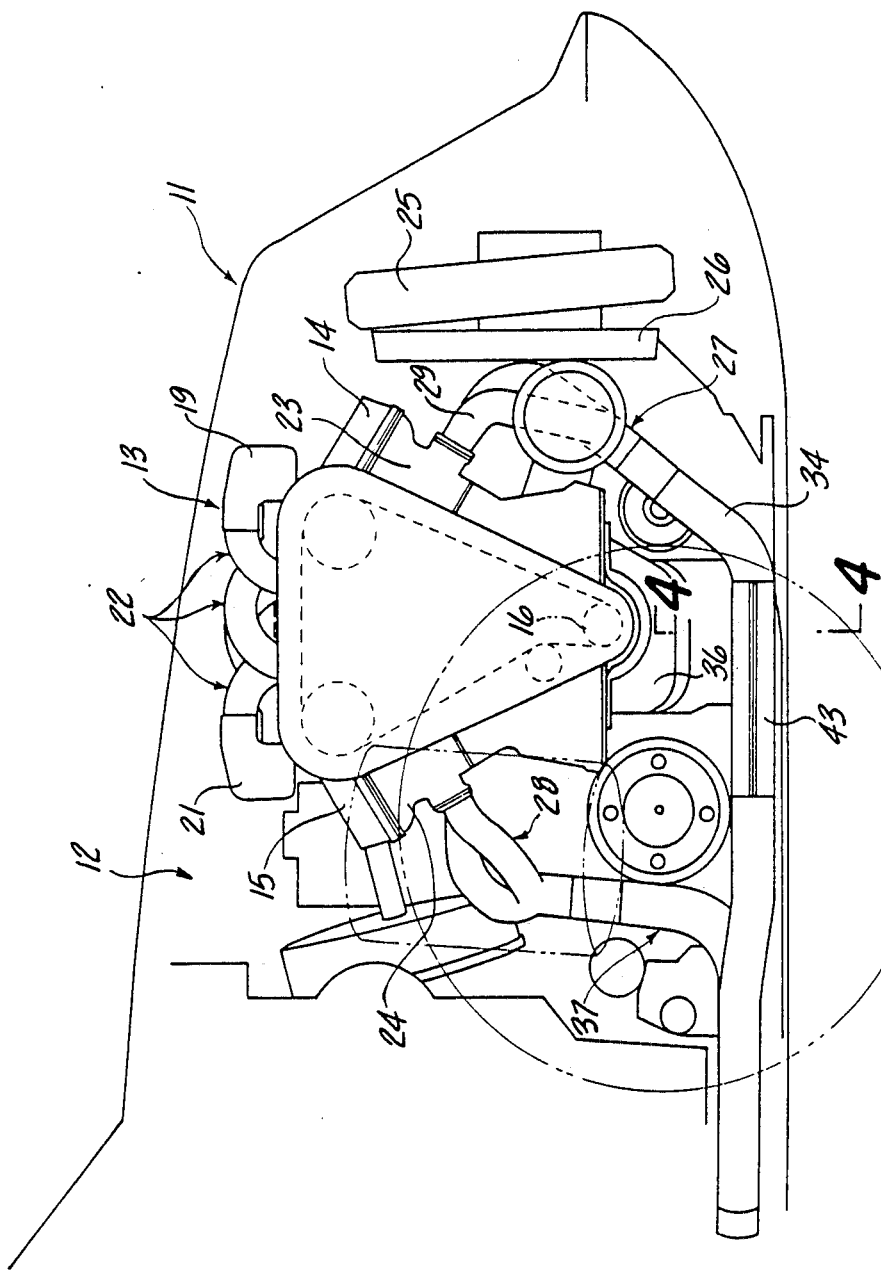
FIG. 3 is a side elevational view showing the engine compartment of the vehicle.

Due to its transverse disposition, the engine crankshaft 16 (FIG. 3) extends transversely of the vehicle and drives a combined clutch, transmission and final drive assembly 17 that is positioned at one side or end of the engine. This assembly 17 drives the front wheels of the vehicle 11 through axle shafts in an appropriate manner.

The engine 13 is also provided with an induction system that is comprised of an inlet device 18 that supplies inlet air to a pair of plenum chambers 19 and 21, each of which is positioned above the respective cylinder bank 14 and 15. A plurality of manifold pipes 22 extend from the plenum chambers 19 and 21 to the respective cylinders of the banks. Since the induction system comprises no portion of the invention, it has not been illustrated nor will it be described in any more detail. Reference may be had to the copending application of Masatoshi Ohmi et al, entitled "Intake Means Of Internal Combustion Engine, Ser. No. 634,795, filed July 26, 1984 and assigned to the assignee of this application for the details of the induction system. The manifold pipes 22 extend to inlet ports formed in cylinder heads 23 and 24 of the banks 14 and 15, respectively.

A cooling radiator 25 is positioned forwardly of the engine 13 in the engine compartment 12. An electrically driven fan 26 is provided for driving air through the radiator 25 to cool the engine in a known manner.

The engine 13 is provided with an exhaust system comprising a front exhaust manifold 27 and a rear exhaust manifold 28. Each manifold 27 and 28 is provided with a plurality of individual pipes 29 and 31, respectively, that extend from the exhaust ports of the respective cylinder heads 23 and 24 and which terminate in respective collector sections 32 and 33. These collector sections 32 and 33 are positioned at one side of the engine or at its front if the engine were viewed as having a normal front to rear configuration.

Figure 2:
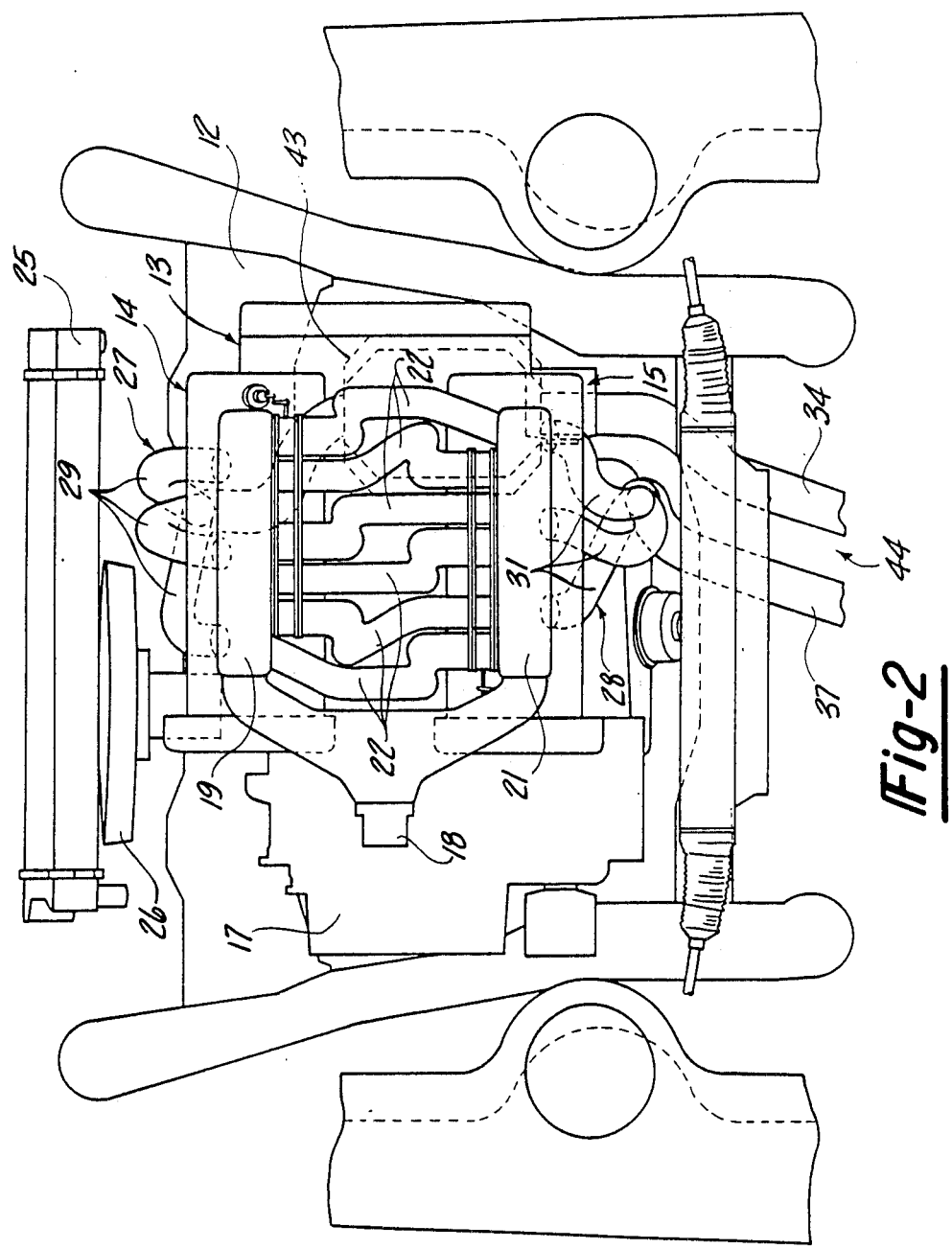
FIG. 2 is an enlarged top elevational view showing the engine compartment of the vehicle.

A first exhaust pipe 34 extends from the front manifold collector section 32 underneath the engine and in a recess 35 formed in the crankcase 36 of the engine at this area. A second exhaust pipe 37 extends from the collector section 33 of the rear exhaust manifold 28. As may be seen in FIGS. 1 and 2, the rear portions of the exhaust pipes 34 and 36 extend parallel and in close proximity to each other. The pipes 34 and 37 merge into a common exhaust pipe 38 that extends to the rear of the vehicle where it feeds into an exhaust device consisting of a main catalytic converter 39 and a muffler 41 which may be formed in a common housing. The exhaust gases are discharged to the atmosphere through a short tailpipe 42.

It should be noted that the manifold 27 is a substantially greater distance from the main catalytic converter 39 than the manifold 28. As a result of this significant difference in distances, the exhaust gases from the manifold 27 may have cooled considerably more those from the manifold 28 by the time they reach the main converter 39. Hence, there is a possibility that those exhaust gases from the front exhaust manifold 27 will not be fully treated in the converter 39 or may not be treated as fully as those from the manifold 28. To compensate for this, a small auxiliary converter 43 is positioned in the exhaust pipe 34 in underlying relationship to the engine and specifically in the crankcase recess 35. The auxiliary converter 43 will function to partially treat the exhaust gases from the manifold 27 and insure that those from both manifolds 27 and 28 will be fully treated prior to discharge to the atmosphere through the tailpipe 42.

For improved tuning and balanced power, a section 44 of the exhaust pipe 37 has a length up to its point of joining with the exhaust pipe 38 that is equal to the portion of the length of the exhaust pipe 34 that leads from the manifold outlet 32 to the auxiliary converter 43.

It should be readily apparent from the foregoing description that the exhaust system described insures full treatment of the exhaust gases from both cylinder banks and that there will be a balanced exhaust loading on each bank. Although an embodiment of the invention has been illustrated and described, various changes and modifications may be made without departing from the spirit and scope of the invention, as defined by the appended claims.

What is claimed is:

1. An exhaust system for an engine having a first exhaust manifold, a second exhaust manifold, a first catalytic converter, a first exhaust pipe portion extending from said first exhaust manifold, a second exhaust pipe portion extending from the second exhaust manifold, said first and said second exhaust pipe portions merging into a common exhaust pipe section leading to said first catalytic converter, and a second catalytic converter being positioned in said first exhaust pipe portion, the length of said second exhaust pipe portion from the outlet of said second exhaust manifold to the merger to said common exhaust pipe section being the same as the length of said first exhaust pipe portion to the inlet to the second catalytic converter from the outlet of said first exhaust manifold, said first exhaust pipe portion being substantially longer than said second exhaust pipe portion.

2. An exhaust system as set forth in claim 1 wherein the engine has a pair of cylinder banks each associated with a respective one of the first and second exhaust manifolds.

3. An exhaust system as set forth in claim 1 wherein the first and second exhaust pipes extend parallel to each other prior to their merger.

4. An exhaust system as set forth in claim 1 wherein the engine has a pair of cylinder banks each associated with a respective one of the first and second exhaust manifolds.

5. An exhaust system as set forth in claim 1 in combination with a motor vehicle with the engine being positioned with its output shaft extending transversely to the motor vehicle, the engine being of the V-type with a forwardly disposed cylinder bank and a rearwardly disposed cylinder bank, the first exhaust manifold being associated with the forwardly disposed exhaust bank and the second exhaust manifold being associated with the rearwardly disposed cylinder bank.

6. An exhaust system as set forth in claim 5 wherein the first and second exhaust pipes extend parallel to each other prior to their merger.

7. In a motor vehicle having a V-type engine disposed with its output shaft extending transversely relative to the vehicle and having forwardly and rearwardly positioned cylinder banks, a first exhaust manifold affixed to said forward cylinder bank for receiving its exhaust gases, a second exhaust manifold connected to said rearward cylinder bank for receiving its exhaust gases, a first exhaust device positioned remotely from the engine, and exhaust pipe means connecting said first and second exhaust manifolds to said first exhaust device for flow of all of the exhaust gases from both said first and said second exhaust manifolds through said first exhaust device, and a second exhaust device positioned contiguous to said engine, said exhaust pipe means being such that exhaust gases flow through the second exhaust device only from the first exhaust manifold.

8. In a motor vehicle as set forth in claim 7 wherein the second exhaust device is positioned beneath the crankcase of the engine.

9. In a motor vehicle as set forth in claim 7 wherein the exhaust pipe means comprises a pair of first and second exhaust pipe sections extending parallel to each other at their outlet ends and merging at their outlet ends, said second exhaust device being positioned in said first exhaust pipe section.

10. In a motor vehicle as set forth in claim 9 wherein the length of the first exhaust pipe section from the outlet of the first exhaust manifold to the inlet of the second exhaust device is equal to the length of the second exhaust pipe section from the outlet of the second exhaust manifold to its point of merger with the first exhaust pipe section.

11. In a motor vehicle as set forth in claim 10 wherein the second exhaust device is positioned beneath the crankcase of the engine.

12. An exhaust system as set forth in claim 8 wherein the first and second exhaust devices comprise catalytic converters.

13. An exhaust system as set forth in claim 12 wherein the exhaust pipe means comprises a first exhaust pipe portion extending from the first exhaust manifold and a second exhaust pipe exhaust pipe portion extending from the second exhaust manifold, said first and said second exhaust pipe portions merging into a common exhaust pipe section leading to the first catalytic converter, the second catalytic converter being positioned in the first exhaust pipe portion.

14. An exhaust system as set forth in claim 13 wherein the length of the second exhaust pipe portion to the merger from the outlet of the second exhaust manifold is the same as the length of the first exhaust pipe portion between the inlet to the second catalytic converter and the outlet of the first exhaust manifold.

* * * * *